United States Patent
Yang

(10) Patent No.: US 8,345,782 B2
(45) Date of Patent: *Jan. 1, 2013

(54) METHOD AND APPARATUS FOR CHANNEL ESTIMATION

(75) Inventor: Shun-An Yang, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 538 days.

This patent is subject to a terminal disclaimer.

(21) Appl. No.: 12/546,813

(22) Filed: Aug. 25, 2009

(65) Prior Publication Data

US 2009/0310714 A1    Dec. 17, 2009

Related U.S. Application Data

(63) Continuation of application No. 11/279,916, filed on Apr. 17, 2006, now Pat. No. 7,602,853.

(51) Int. Cl.
*H04L 27/28* (2006.01)
*H04K 1/10* (2006.01)
(52) U.S. Cl. ......... 375/260; 375/316; 375/340; 375/350
(58) Field of Classification Search .................. 375/340, 375/260, 316, 350
See application file for complete search history.

(56) References Cited

U.S. PATENT DOCUMENTS

| | | | |
|---|---|---|---|
| 6,687,315 B2 | 2/2004 | Keevill et al. | |
| 7,016,298 B2 | 3/2006 | Akiyama et al. | |
| 7,248,559 B2 | 7/2007 | Ma et al. | |
| 7,286,466 B2 | 10/2007 | Chen | |
| 2002/0039383 A1* | 4/2002 | Zhu et al. | 375/214 |
| 2004/0188399 A1 | 9/2004 | Smart | |

FOREIGN PATENT DOCUMENTS

| | | |
|---|---|---|
| EP | 1221793 | 7/2002 |
| EP | 1335552 | 8/2003 |

* cited by examiner

*Primary Examiner* — Ted Wang
(74) *Attorney, Agent, or Firm* — McClure, Qualey & Rodack, LLP

(57) ABSTRACT

The invention relates to DVB-T system, and in particular, to a channel estimation method for OFDM symbols. A plurality of symbols are received to generate a pilot response. A finite impulse response is generated from the pilot response. A coefficient table is selected based on the characteristics of the finite impulse response. The channel is estimated by interpolating the pilot response based on the coefficient table.

16 Claims, 6 Drawing Sheets

US 8,345,782 B2

METHOD AND APPARATUS FOR CHANNEL ESTIMATION

CROSS REFERENCE TO RELATED APPLICATIONS

This application is a Continuation of U.S. patent application Ser. No. 11/279,916, filed Apr. 17, 2006, now U.S. Pat. No. 7,602,853, the entirety of which is incorporated by reference herein.

BACKGROUND

The invention relates to OFDM communication systems, and in particular, to a channel estimation method for DVB-T system.

FIG. 1a shows conventional DVB-T symbols. The horizontal rows are DVB-T symbols comprising a plurality of sub-carriers, arranged in vertical time direction. The white nodes frequency direction interpolator 110 carry data, and the black nodes such as 210a, 210b and 210c, are pilots. The distribution of pilots varies in time direction, periodically repeating every four symbols. Conventionally, pilots are utilized to estimate the channel. For example, a pilot response at the fifth row (t=5) is generated by interpolation of adjacent pilots in time direction. The pilots 210a and 230a interpolate the pilot 220a, the pilots 210b and 230b interpolate the pilot 220b, and the pilots 210c and 230c interpolate the pilot 220c. The interpolation may be a linear interpolation, and is also referred to as a time direction interpolation (TDI).

FIG. 1b shows a pilot response obtained from the DVB-T symbols of FIG. 1a. The pilots $H_0$ to $H_5$ are shown at an interval. The channels for the sub-carriers therebetween, such as $H_a$ and $H_b$, are estimated by frequency direction interpolation. Conventionally, the frequency direction interpolation may be accomplished through various algorithms, such as linear interpolation, second order interpolation, third order interpolation, bi-linear interpolation and fixed finite impulse response (FIR) interpolation. The estimated channel is utilized to restore transmitted data in the sub-carriers in an equalization process, therefore an efficient channel estimation method can improve the DVB-T receiver performance.

SUMMARY

An exemplary channel estimation method for an OFDM receiver is provided. A plurality of symbols are received to generate a pilot response. A finite impulse response is generated from the pilot response. A coefficient table is selected based on the characteristics of the finite impulse response. The channel is estimated by interpolating the pilot response based on the coefficient table.

The generation of the pilot response may accomplished by collecting all pilots distributed in the plurality of symbols, and interpolating the adjacent pilots in time direction to determine an element in the pilot response. Generation of the finite impulse response may accomplished by performing IFFT on the pilot response.

The finite impulse response is further filtered to eliminate components under a predetermined threshold to generate a window, and a width and a position of which are determined.

A plurality of coefficient tables are further provided, each adaptable for a specific window width. One coefficient table is selected based on the window width to estimate the channel.

A plurality of coefficient vectors are further generated from the coefficient table based on the window position. The coefficient tables comprise a plurality set of real numbers, and the coefficient vectors are generated by rotating the real numbers by an angle corresponding to the window position. The coefficient vectors are multiplied with elements in the pilot response to rebuild the channel.

Another embodiment of the invention provides a channel estimator performing the described method.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 1b shows a pilot response obtained from the DVB-T symbols of FIG. 1a;

DETAILED DESCRIPTION

A detailed description of the present invention is provided in the following.

Figure 1A:
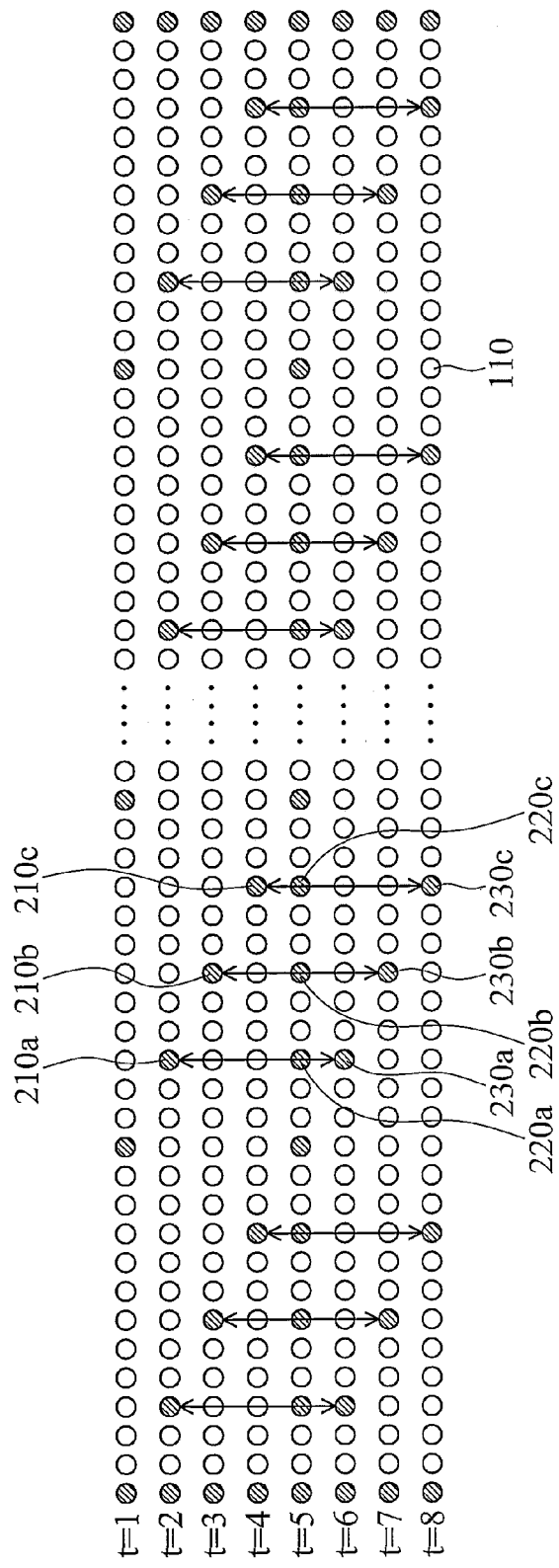
FIG. 1a shows conventional DVB-T symbols.
Figure 1B:
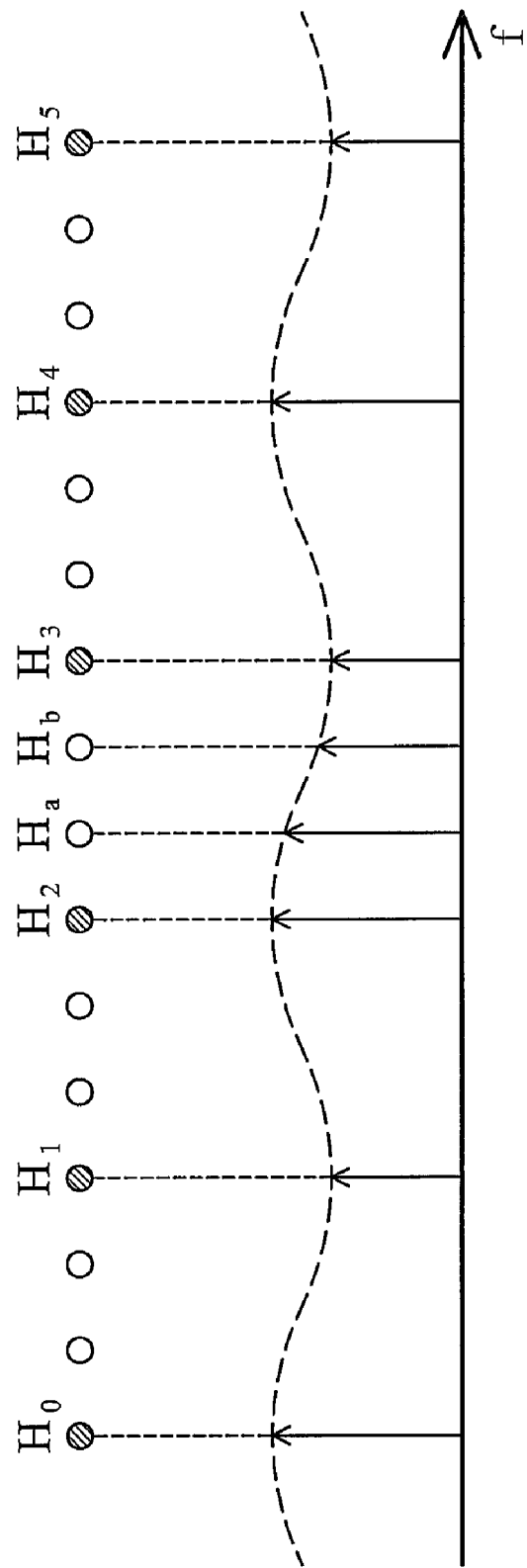
Figure 2:
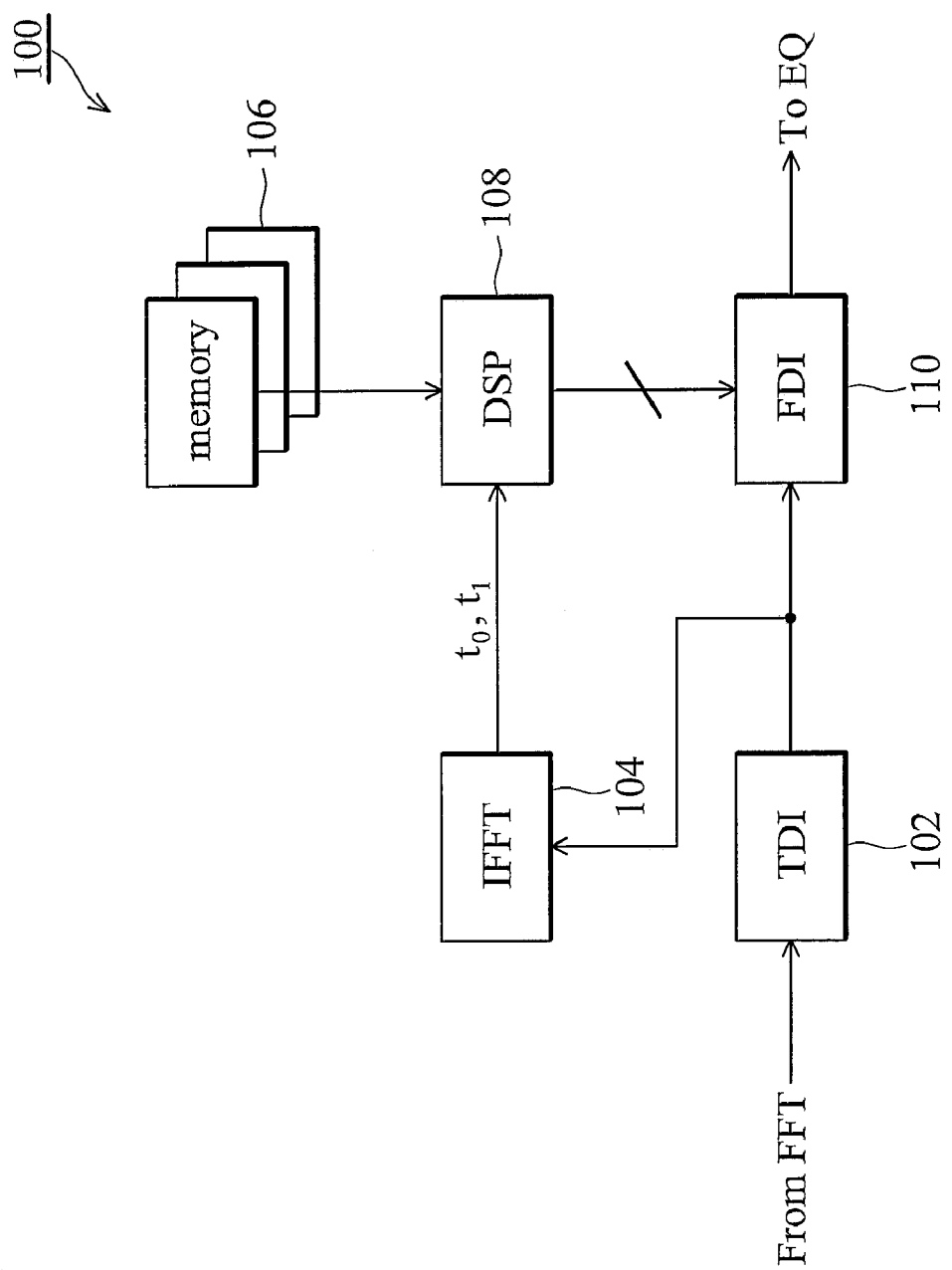
FIG. 2 is a block diagram of a channel estimator according to an embodiment of the invention.

FIG. 2 is a block diagram of a channel estimator according to an embodiment of the invention. A novel interpolation method is provided. A time direction interpolator 102 receives a plurality of symbols from a front end such as a FFT unit (not shown), with frame synchronized and guard interval removed, such that a symbol array shown as FIG. 1a is obtained, comprising a plurality of consecutive symbols. The pilots in the symbols are scattered as the specification defines, distributed periodically to facilitate channel estimation. The time direction interpolator 102 performs a time direction interpolation to generate a pilot response comprising the interpolated pilots as shown in the fifth symbol in FIG. 1a. A leaky integrator may be utilized to perform the time direction interpolation, with pilot response an averaged result. For a DVB-T 2K mode, a symbol may comprise 1705 effective sub-carriers, ⅓ thereof interpolated to form the pilot response since the pilots are scattered every 3 sub-carriers. The elements in the pilot response vary with mode. For example, including the first pilot, the elements are 569 in the 2K mode, 1137 in the 4K mode, and 2273 in the 8K mode. The pilot response represents a preliminary channel, and a frequency direction interpolation is required to rebuild a complete channel for restoration of every sub-carrier in the symbols. An IFFT unit 104 is coupled to the time direction interpolator 102, performing IFFT to generate a finite impulse response from the pilot response. In the IFFT unit 104, the finite impulse response is filtered to eliminate components under a predetermined threshold, such that a window is generated. The threshold may be a fixed value, or a ratio of the maximum magnitude in the finite impulse response. The remaining impulses after filtering form a window, and the window width $t_1$ and window position $t_0$ are determined. The window width $t_1$ is the duration from the first impulse to the last impulse, and the window position $t_0$ is the time index of the center of the window width $t_1$. The $t_0$ and $t_1$ are sent to the DSP 108. The DSP 108 is coupled to the IFFT unit 104 and a memory 106. The memory 106 provides a plurality of coefficient tables each adaptable for a specific window width, and the DSP 108 selects one of the coefficient tables based on the window width $t_1$ of the finite impulse response. The coefficient tables are programmable sets of real numbers specifically designed for the frequency direction interpolation. After determining a coefficient table according to the window width, the real numbers therein are rotated by the DSP 108 with an angle corresponding to the window position $t_0$, thus a plurality of coefficient vectors are generated. In this way, the coefficient vectors are a function of the window width $t_1$ and window position $t_0$, and the frequency direction interpolation can be performed therewith. The frequency direction interpolator 110 is coupled to the time direction interpolator 102 and the DSP 108, multiplying the coefficient vectors with elements in the pilot response to rebuild the channel.

Figure 3:
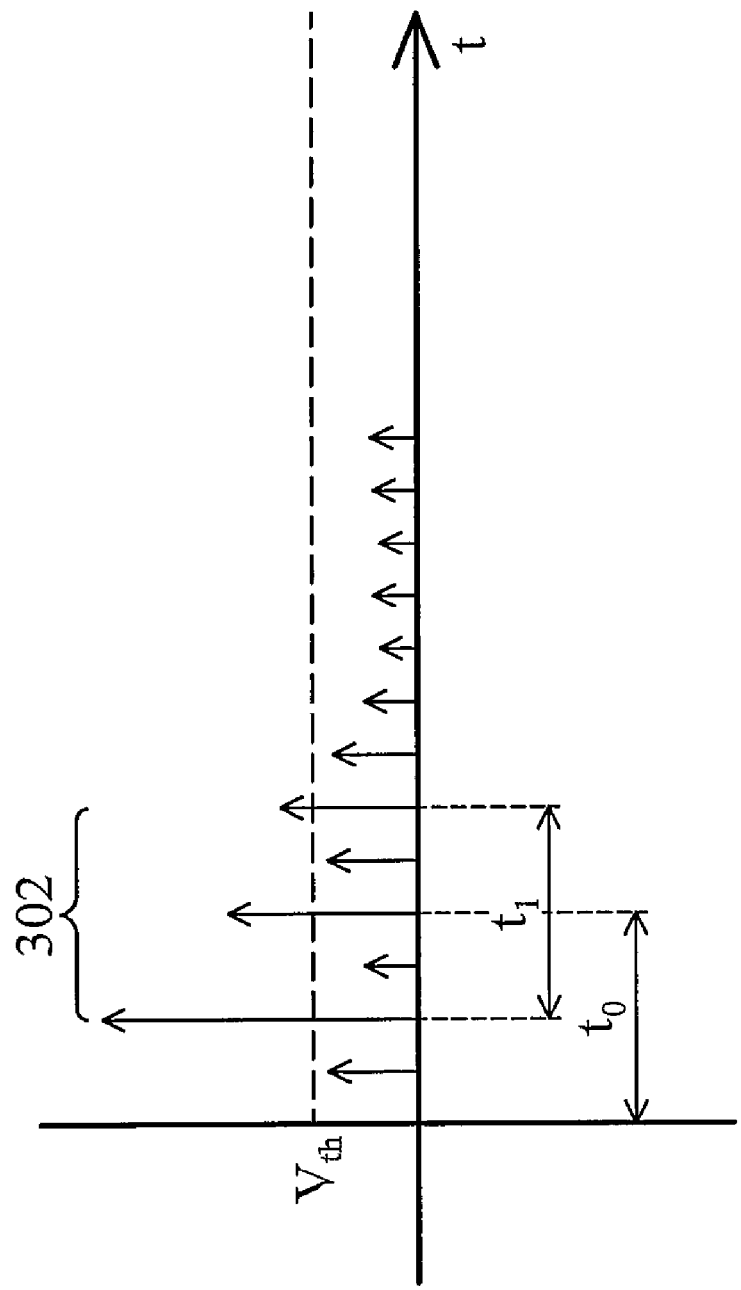
FIG. 3 shows a finite impulse response generated from the pilot response.

FIG. 3 shows a finite impulse response generated from the pilot response. As described, the pilot response may comprise different numbers of elements in different modes, and an IFFT is performed to generate the finite impulse response. Specifically, to facilitate the IFFT implementation, the number of elements selected to perform the IFFT may be an exponent of 2, such as $2^M$ where M is an integer. The IFFT may be performed multiple times over a period to obtain averaged results among a plurality of symbols, thus the finite impulse response is averaged. An autoregression moving average algorithm may also be applied to keep the finite impulse response updated. A threshold $V_{th}$ is set to filter noise components. As described, the threshold $V_{th}$ may be a fixed value or a ratio of the maximum magnitude in the finite impulse response. The remaining impulses exceeding the threshold $V_{th}$ are deemed to be valid channel paths, and a window 302 is formed therefrom. The duration from the first impulse to the last impulse in the window 302, is determined to be the window width $t_1$. The time index of the middle of the window is determined to be the window position $t_0$. The window width is also referred to as a channel length, and the window position is the channel position. One of the coefficient tables is selected based on the window width, such that the interpolation error in the frequency direction interpolator 110 can be minimized.

Figure 4:
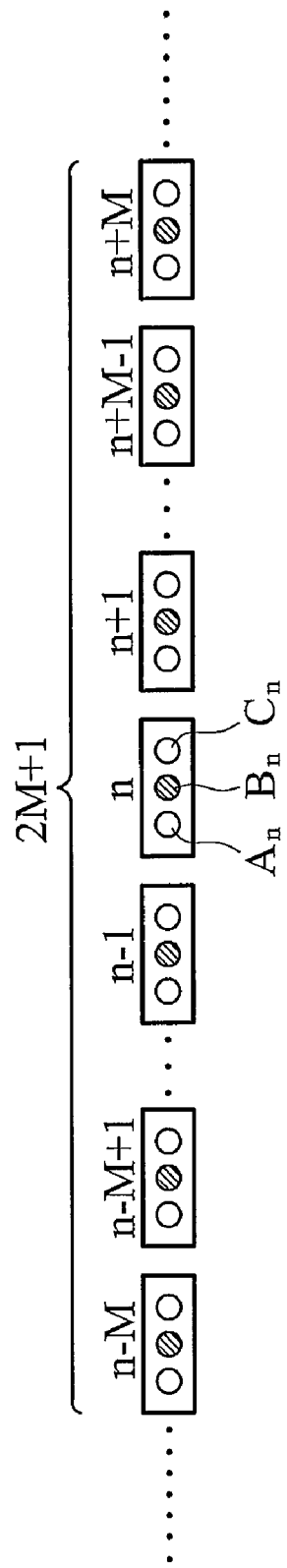
FIG. 4 shows an embodiment of the frequency direction interpolation.

FIG. 4 shows an embodiment of the frequency direction interpolation. A plurality of coefficient vectors are provided to perform the interpolation. For example, three coefficient vectors are provided as $W_a$, $W_b$ and $W_c$:

$W_a = \{W_{a1}, W_{a2}, W_{a3}, W_{a4}, \ldots, W_{aN}\}$
$W_b = \{W_{b1}, W_{b2}, W_{b3}, W_{b4}, \ldots, W_{bN}\}$
$W_c = \{W_{c1}, W_{c2}, W_{c3}, W_{c4}, \ldots, W_{cN}\}$ where the coefficients therein can be described as:
$W_{ak} = e^{j(3M-3k-1)\Theta} R_{ak}$ k=1 to N
$W_{bk} = e^{j(3M-3k)\Theta} R_{bk}$ k=1 to N
$W_{ck} = e^{j(3M-3k+1)\Theta} R_{ck}$ k=1 to N The number N can be 2M+1, where M is an integer not exceeding ½ of the element numbers in the pilot response, and the angle $\Theta$ is obtained by the window position $t_0$:

$$\theta = \frac{2\pi \cdot t_0}{L}$$

wherein L is a predetermined value corresponding to the FFT size when receiving the symbol. The $R_{ak}$, $R_{bk}$ and $R_{ck}$ with k=1 to N, are real numbers provided in the selected coefficient table. Thus, the coefficients in the coefficient vectors are obtained by the DSP 108 transforming the real numbers in the selected coefficient table based on the angle $\Theta$.

As shown in FIG. 4, the n-th group of the pilot elements comprises $A_n$, $B_n$ and $C_n$, where $B_n$ is the n-th pilot and the $A_n$ and $C_n$ are adjacent channels to be determined. Thus, the channel corresponding to the n-th group of sub-carriers can be estimated as:

$A_n = W_{a1}B_1 + W_{a2}B_2 + W_{a3}B_3 + \ldots + W_{aN}B_N$ $B_n = W_{b1}B_1 + W_{b2}B_2 + W_{b3}B_3 + \ldots + W_{bN}B_N$ $C_n = W_{c1}B_1 + W_{c2}B_2 + W_{c3}B_3 + \ldots + W_{cN}B_N$ Note that the n-th pilot $B_n$ itself is updated from the original known value, and the equation can be generalized to the forms of:

$$A_n = \sum_{k=-M}^{M} B_{n+k} W_{ak}$$

$$B_n = \sum_{k=-M}^{M} B_{n+k} W_{bk}$$

$$C_n = \sum_{k=-M}^{M} B_{n+k} W_{ck}$$

In this way, the channel corresponding to every sub-carrier in a symbol can be obtained from the interpolation equation. After the channel estimation in the frequency direction interpolator 110, the symbols are sent to an equalizer for further processes.

Figure 5:
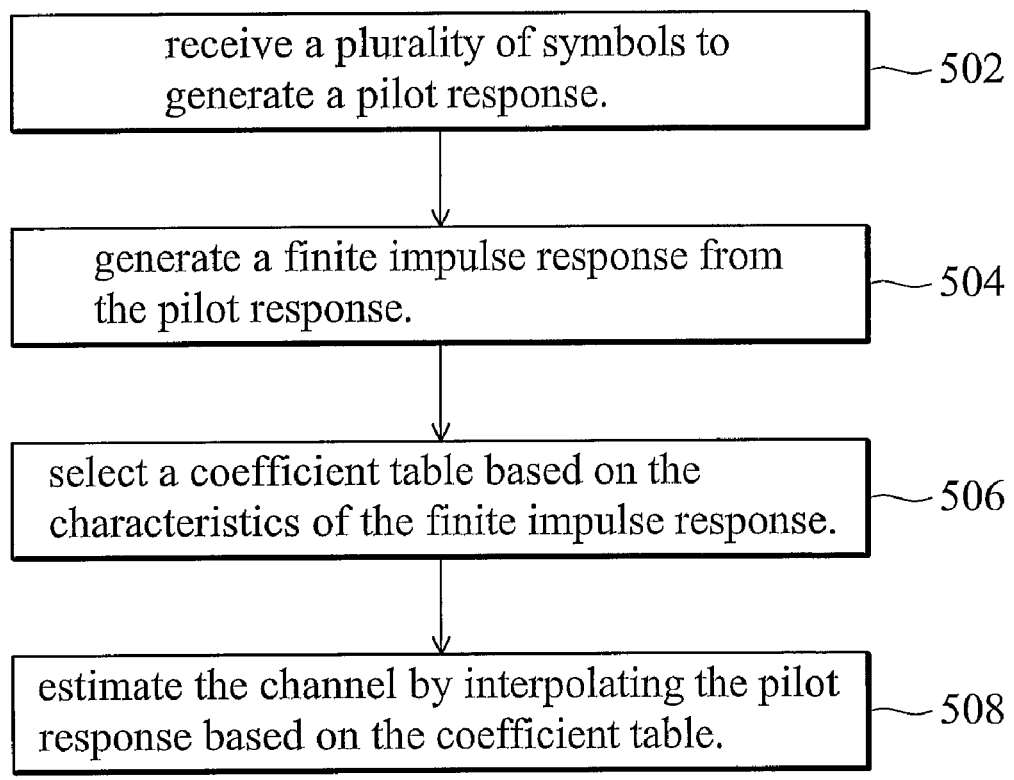
FIG. 5 is a flowchart of the channel estimation method according to the invention.

FIG. 5 is a flowchart of the channel estimation method according to the invention. In step 502, a plurality of symbols are received to generate a pilot response. In step 504, a finite impulse response is generated from the pilot response. In step 506, a coefficient table is selected based on the characteristics of the finite impulse response. In step 508, the channel is estimated by interpolating the pilot response based on the coefficient table.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A channel estimator for an orthogonal frequency division multiplexer (OFDM) receiver, comprising:
    a time direction interpolator, receiving a plurality of symbols to generate a pilot response;
    an inverse Fast-Fourier Transform (IFFT) unit, coupled to the time direction interpolator, generating a finite impulse response from the pilot response;
    a digital signal processing unit, coupled to the IFFT unit, determining a coefficient set based on the characteristics of the finite impulse response; and
    a frequency direction interpolator, coupled to the time direction interpolator and the digital signal processing unit, estimating the channel by interpolating the pilot response based on the coefficient set.

2. The channel estimator as claimed in claim 1, wherein:
    the time direction interpolator generates the pilot response by collecting all pilots distributed in the plurality of symbols; and an element in the pilot response is determined by interpolating the adjacent pilots in time direction.

3. The channel estimator as claimed in claim 1, wherein the IFFT unit performs IFFT on the pilot response to generate the finite impulse response.

4. The channel estimator as claimed in claim 3, wherein:
the IFFT unit filters the finite impulse response by eliminating components under a predetermined threshold to generate a window; and
the IFFT unit determines a window width and a window position from the window.

5. The channel estimator as claimed in claim 4, further comprising a memory, providing a plurality of coefficient tables each adaptable for a specific window width, wherein the digital signal processing unit is coupled to the memory, selecting a coefficient table based on the window width for determining the coefficient set.

6. The channel estimator as claimed in claim 5, wherein the digital signal processing unit generates a plurality of coefficient vectors as the coefficient set from the coefficient table based on the window position.

7. The channel estimator as claimed in claim 6, wherein:
the coefficient tables comprise a plurality set of real numbers; and
the digital signal processing unit rotates the real numbers by an angle corresponding to the window position, such that the coefficient vectors are generated.

8. The channel estimator as claimed in claim 7, wherein the frequency direction interpolator multiplies the coefficient vectors with elements in the pilot response to rebuild the channel.

9. A channel estimation method for execution by an orthogonal frequency division multiplexer (OFDM) receiver, comprising:
receiving by the OFDM receiver a plurality of symbols to generate a pilot response;
generating a finite impulse response from the pilot response;
determining a coefficient set based on the characteristics of the finite impulse response; and
estimating the channel by interpolating the pilot response based on the coefficient set.

10. The channel estimation method as claimed in claim 9, wherein the generation of the pilot response comprises:
collecting all pilots distributed in the plurality of symbols; and
interpolating the adjacent pilots in time direction to determine an element in the pilot response.

11. The channel estimation method as claimed in claim 10, wherein the generation of the finite impulse response comprises performing an inverse Fast-Fourier Transform (IFFT) to the pilot response.

12. The channel estimation method as claimed in claim 11, further comprising:
filtering the finite impulse response by eliminating components under a predetermined threshold to generate a window; and
determining a window width and a window position from the window.

13. The channel estimation method as claimed in claim 12, further comprising providing a plurality of coefficient tables each adaptable for a specific window width, wherein one coefficient table is selected based on the window width for the determination of the coefficient set.

14. The channel estimation method as claimed in claim 13, further comprising generating a plurality of coefficient vectors as the coefficient set from the coefficient table based on the window position.

15. The channel estimation method as claimed in claim 14, wherein:
the coefficient tables comprise a plurality set of real numbers; and
the generation of the coefficient vectors comprises rotating the real numbers by an angle corresponding to the window position, such that the coefficient vectors are generated.

16. The channel estimation method as claimed in claim 15, wherein the pilot response interpolation comprises multiplying the coefficient vectors by elements in the pilot response to rebuild the channel.

* * * * *